US006810458B1

(12) United States Patent
Bazargan et al.

(10) Patent No.: US 6,810,458 B1
(45) Date of Patent: Oct. 26, 2004

(54) METHOD AND CIRCUIT FOR HOT SWAP PROTECTION

(75) Inventors: Hassan K. Bazargan, San Jose, CA (US); Jian Tan, Milpitas, CA (US); Atul V. Ghia, San Jose, CA (US); Suresh M. Menon, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 420 days.

(21) Appl. No.: 10/090,257

(22) Filed: Mar. 1, 2002

(51) Int. Cl.[7] .............................................. G06F 13/00
(52) U.S. Cl. ......................... 710/302; 710/301; 326/87
(58) Field of Search ................................. 710/301–304, 710/2; 326/87; 323/908; 327/562; 361/679, 686; 439/620

(56) References Cited

U.S. PATENT DOCUMENTS

| | | | |
|---|---|---|---|
| 5,317,697 A | * | 5/1994 | Husak et al. ................ 710/302 |
| 5,361,373 A | | 11/1994 | Gilson |
| 5,383,081 A | * | 1/1995 | Nishikawa .................... 361/58 |
| 5,537,601 A | | 7/1996 | Kimura et al. |
| 5,568,610 A | * | 10/1996 | Brown ........................ 714/48 |
| 5,617,081 A | * | 4/1997 | Madnick et al. ............ 710/302 |
| 5,652,904 A | | 7/1997 | Trimberger |
| 5,671,355 A | | 9/1997 | Collins |
| 5,752,035 A | | 5/1998 | Trimberger |
| 5,764,926 A | * | 6/1998 | Fukuda et al. ............... 710/302 |
| 5,970,254 A | | 10/1999 | Cooke et al. |
| 6,020,755 A | | 2/2000 | Andrews et al. |
| 6,096,091 A | | 8/2000 | Hartmann |
| 6,279,045 B1 | | 8/2001 | Muthujumaraswathy et al. |
| 6,282,627 B1 | | 8/2001 | Wong et al. |
| 6,286,066 B1 | * | 9/2001 | Hayes et al. ................ 710/302 |
| 6,343,207 B1 | | 1/2002 | Hessel et al. |
| 6,401,157 B1 | * | 6/2002 | Nguyen et al. ............. 710/302 |
| 6,625,681 B1 | * | 9/2003 | Erickson et al. ............ 710/302 |

OTHER PUBLICATIONS

"Experimental research on a hot swappable bus system" by Yamada, T.; Kaminaga, Y.; Kurosawa, K.; Ohashi, A.; Masui, K. (abstract only).*
"Dynamic hardware plugins in an FPGA with partial run–time reconfiguration" by Horta, E.L.; Lockwood, J.W.; Taylor, D.E.; Parlour, D. (abstract only).*
Cary D. Snyder and Max Baron; "Xilinx's A–to–Z System Platform"; Cahners Microprocessor; The Insider's Guide to Microprocessor Hardware; Microdesign Resources; Feb. 6, 2001; pp. 1–5.

* cited by examiner

Primary Examiner—Gopal C. Ray
(74) Attorney, Agent, or Firm—Pablo Meles

(57) ABSTRACT

A hot swap protection circuit (40) for an integrated circuit being plugged into a powered-up system includes a first circuit (10) for detecting a hot swap condition, a second circuit (20) coupled to the first circuit for preventing a pn junction diode (52) in a pull-up transistor (32) from going into a forward bias condition, and a third circuit (30) coupled to the first and second circuits for preventing the pull-up transistor from turning on during the hot swap condition.

29 Claims, 3 Drawing Sheets

METHOD AND CIRCUIT FOR HOT SWAP PROTECTION

FIELD OF THE INVENTION

This invention relates generally to protection circuitry, and more particularly to a method and system for inserting an un-powered circuit into a powered-on (hot) running system.

BACKGROUND OF THE INVENTION

As chip capacity continues to significantly increase, the use of programmable gate arrays (PGAs), is particularly field programmable gate arrays (FPGAs), is quickly replacing the use of application specific integrated circuits (ASICs). An ASIC is a specialized chip that is designed for a particular application. Notably, an FPGA is a programmable logic device (PLD) that has an extremely high density of electronic gates as compared to an ASIC. This high gate density has contributed immensely to the popularity and flexibility of FPGAs. Furthermore, it has become a common industry practice to "Hot-swap" plug-in boards that contain integrated circuits such as FPGAs into powered-on systems.

Hot-swapping or hot insertion is a potentially dangerous method of inserting an un-powered board (containing integrated circuitry) into a power-on running system. Typically, concerns revolve around avoiding physical harm or permanent damage to the system or to the inserted board and avoiding data corruption or any transient system upsets.

Plug-in boards or printed circuit boards (PCB) typically need replacement in a system due to system failure, routine maintenance, or system upgrading. There are basically two ways of plugging in a PCB which contains a number of integrated circuit devices into a main system or a system backplane. One is to power down the whole system, plug in the board and then power up the system again. This method fails to meet the reality and practicality of today's market demands requiring hot-swaps. The alternative is to plug in the boards or PCBs without powering down the system at the risk of damaging either the system or the boards being plugged in or both. There could be various reasons for the preference for hot swapping. For example, it may take too long for the system to be rebooted or the system performance could not be interrupted during repair work.

The problem that arises from hot swapping is the relatively long time it takes for the power to reach operating levels on the board due to the heavy capacitive load. Since the parts on the board are being connected to an active system, the input/output (I/O) pins of the integrated circuits on the board may see a logic level 1 (3.3 v or 2.5 v for example) long before the power is restored to the chip on the board. When this happens, due to the forward biasing of a pn junction diode at a pad of the board and due to the backward conduction of a pull-up driver at the pad, a high amount of current will flow through the package which may damage the system. Thus, a need exists to circumvent the problem described above when plugging in an integrated circuit microchip or a system board containing microchips into a powered-up system.

SUMMARY OF THE INVENTION

In a first aspect of the present invention, a hot swap protection circuit for an integrated circuit being plugged into a powered-up system comprises a first circuit for detecting a hot swap condition, a second circuit coupled to the first circuit for preventing a pn junction diode in a pull-up transistor from going into a forward bias condition, and a third circuit coupled to the first and second circuits for preventing the pull-up transistor from turning on during the hot swap condition.

In another aspect of the invention, a method of protecting a powered-up system during the insertion of an integrated circuit comprises the steps of detecting a hot swap condition, preventing a forward bias condition in a pn junction diode of a pull-up transistor of the integrated circuit during the hot swap condition, and biasing the pull-up transistor coupled to a pad of the integrated circuit to remain turned off during the hot swap condition.

In yet another aspect of the present invention, a method of protecting a powered-up system during the insertion of a printed circuit board containing an integrated circuit, comprises the steps of detecting a hot swap condition, isolating an nwell of a pmos pull-up transistor from a power source of the powered-up system during the hot swap condition, and preventing the pmos pull-up transistor coupled to a pad of the printed circuit board from turning on during the hot swap condition.

DETAILED DESCRIPTION OF THE DRAWINGS

As previously mentioned, hot swap is referred to plugging in an integrated circuit device into a live or powered-up system. During hot swap, the input/output (IO) supply voltage (VCCO) can go up quite slowly due to the capacitance on the VCCO line. But, the IO pins may see a logic level 1 (3.3 v or 2.5 v, etc.) immediately.

Preferably, a system in accordance with the present invention comprises a system to detect the hot swap condition. Preferably, this includes a system that detects both the beginning and the end of the hot swap condition. The system also comprises a circuit that prevents a p-n junction diode of a pull-up transistor from going into a forward bias condition. Finally, the system in accordance with the present invention also comprises a circuit for preventing the pull-up transistor coupled to a pad from turning on.

Figure 1:
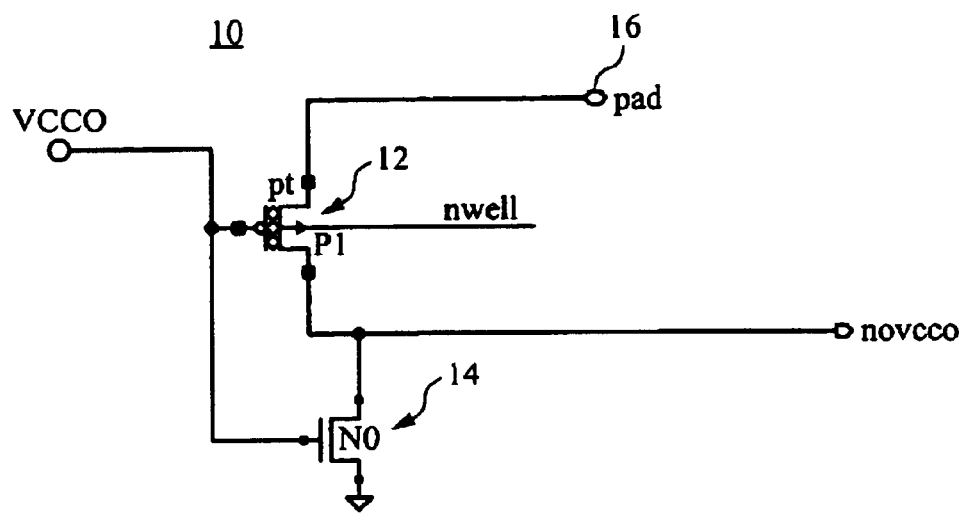
FIG. 1 is a circuit diagram of a hot swap detection circuit in accordance with the present invention.

Referring to FIG. 1, a hot swap detector circuit 10 is shown in accordance with the present invention. A gate of the transistor 12 (P1) is connected to VCCO and the drain of transistor 12 is connected to a pad 16. If the voltage at the pad 12 goes a predetermined voltage level above VCCO, then the transistor 12 will begin to conduct and the node N0vcco will rise to the voltage level of the pad 16. This basically means that the hot swap is in progress or that a hot swap condition has been detected. When VCCO rise to within a predetermined voltage level of the pad 16 voltage level, transistor 12 will shut off and the transistor 14 (N0) which acts as a weak leaker will pull the N0vcco signal low indicating the end of the hot swap condition. It should be understood that in many instances the "predetermined voltage" in the examples described will actually be based on the threshold voltage of a PMOS transistor (Vthp). Thus, this predetermined voltage will usually be predetermined by process fabrication of the device involved.

Figure 2:
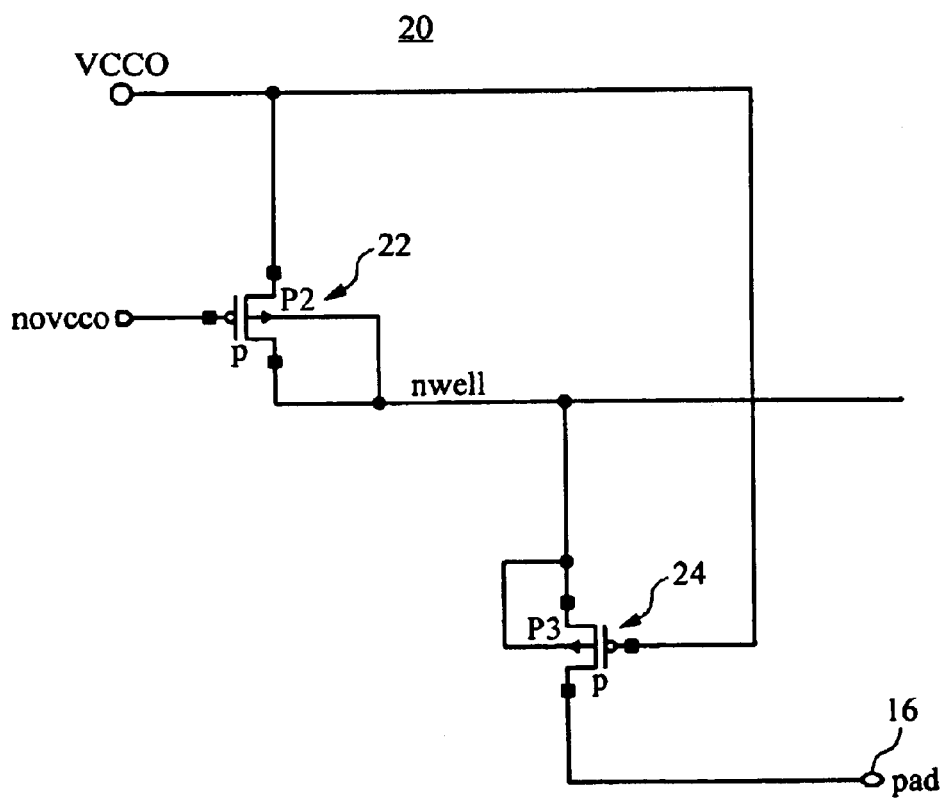
FIG. 2 is a circuit diagram of a circuit that prevents a pn junction diode from going into forward bias conduction in accordance with the present invention.
Figure 3:
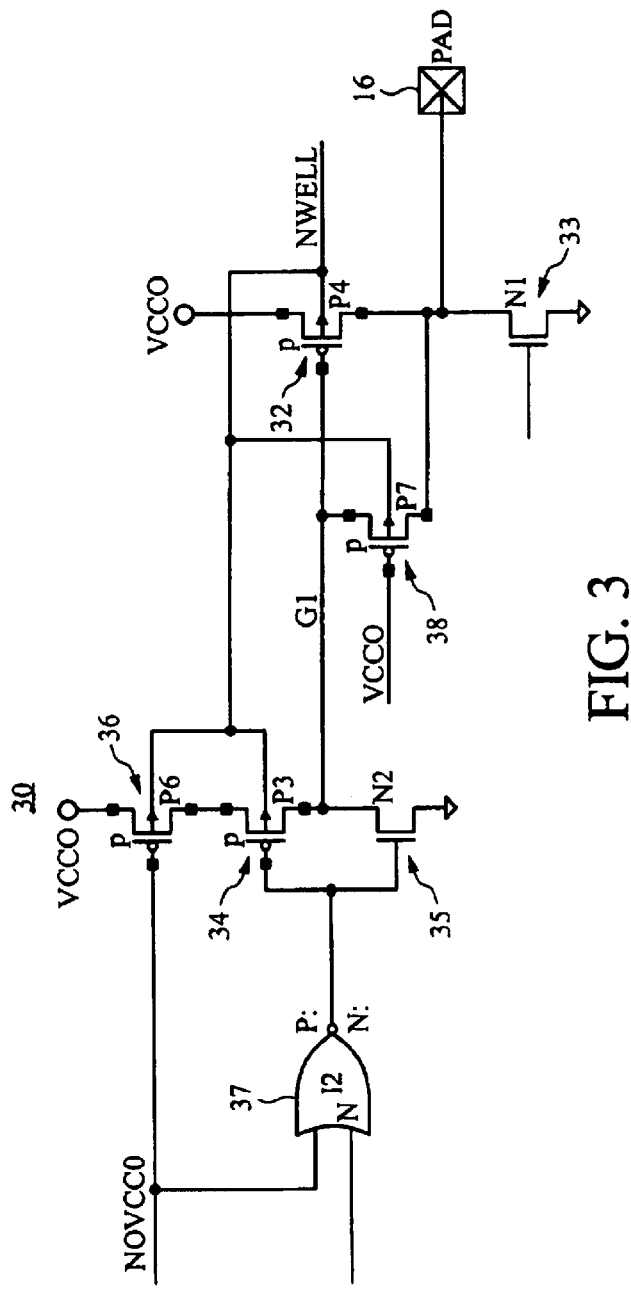
FIG. 3 is a circuit diagram of a circuit that prevents a pull-up transistor connected to a pad from turning on in accordance with the present invention.

Referring to FIG. 2 and FIG. 3, to prevent the NWELL of the pull-up transistor 32 (P4) from going into forward bias conduction, the NWELL needs to be disconnected from VCCO temporarily during the hot swap operation. The circuit 20 of FIG. 2 isolates the NWELL of pull-up transistor 32 from VCCO during the hot swap condition. The NWELL of transistor 32 is connected to VCCO through the transistor 22 (P2). The gate of transistor 22 is connected to the N0vcco signal. As mentioned above, when a hot swap condition is detected, the signal N0vcco will go high (to the level of the voltage at the pad, which at this point would be at least a predetermined voltage higher than VCCO.) When N0vcco goes high, transistor 22 shuts off and the NWELL gets isolated from VCCO. Transistor 24 (P3) is biased similar to transistor 12 of FIG. 1. When the voltage at the pad 16 goes a predetermined voltage above VCCO, transistor 12 begins to conduct and will charge the NWELL to the level of the voltage at the pad 16 hence preventing the NWELL's pn junction diode from going into a forward bias condition. When VCCO rises to a predetermined level of the voltage at the pad 16, transistor 24 shuts off, the signal N0vcco goes low which turns on transistor 22 and biases the NWELL to VCCO again.

Referring to FIG. 3, one of the pad's discharge paths during hot swap is the pmos pull-up driver or transistor 32. The circuit 30 cuts off the flow of current through transistor 32 during the hot swap condition. When a hot swap is detected, meaning the signal at the pad 16 is a predetermined voltage higher than VCCO, then the N0vcco signal goes high and forces the output of the NOR gate 37 low. Transistor 38 (P7) turns on and pulls up the gate of transistor 32 high to the pad voltage and in effect turns the transistor 32 off. Transistor 38 turns transistor 32 off by directly supplying voltage of the pad 16 to transistor 32's gate. Transistor 34 pre-drives the signal to turn transistor 32 off. If the voltage at node G1 goes up, then transistor 34 will be on because the gate of transistor 34 is still low. During the charge up of a node G1 shown in FIG. 3, transistor 36 is turned off by signal N0vcco allowing the charge to remain on node G1 as long as necessary to keep transistor 32 off. The transistor 33 (N1) preferably serves to pull down the IO circuit. Transistor 35 (N2) preferably serves as a normal NMOS pull down to activate transistor 32 during normal operation. After N0vcco goes low, transistor 36 (P6) will turn on and normal operation is restored.

Figure 4:
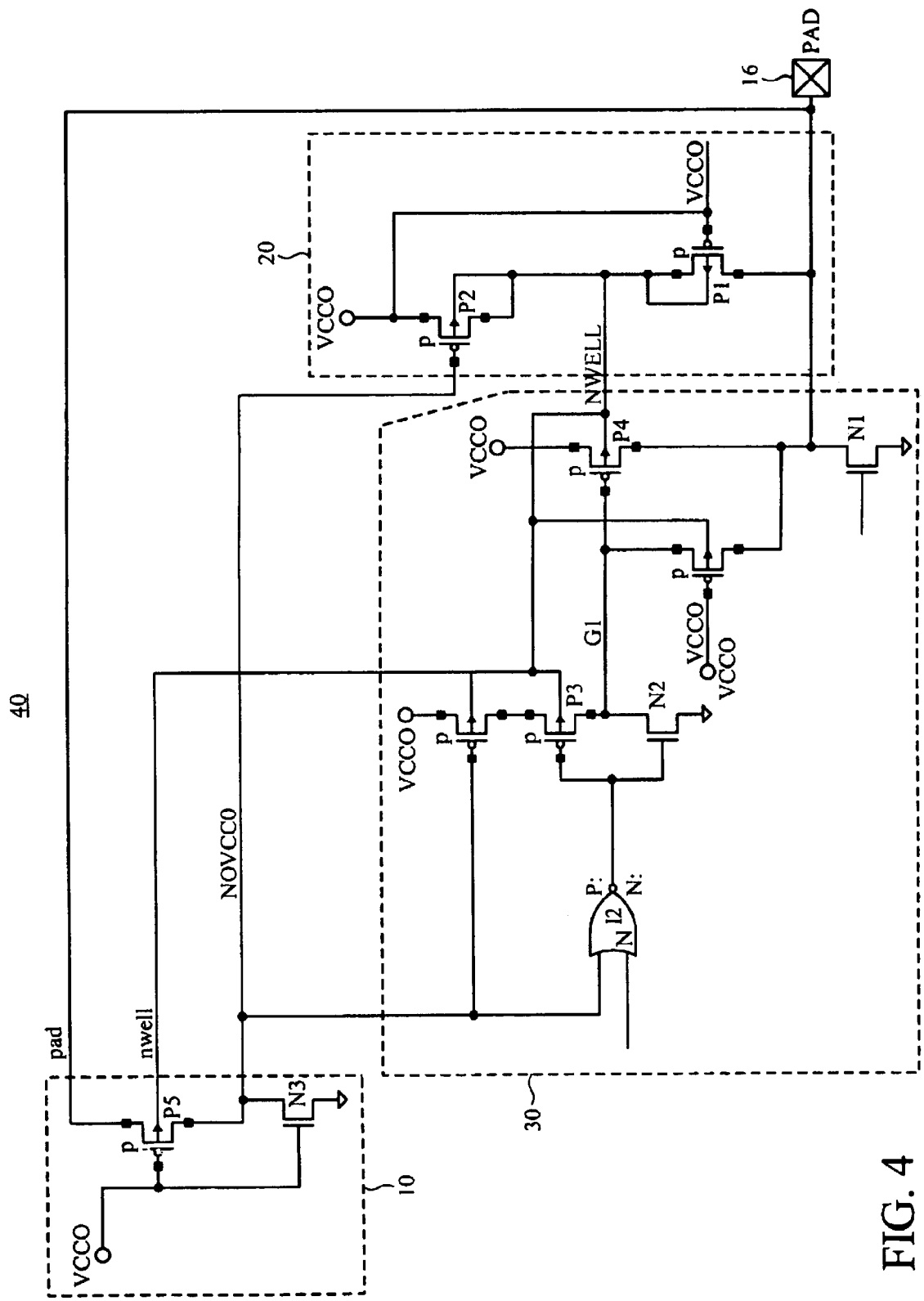
FIG. 4 is a system diagram including the circuits of FIGS. 1–3 in accordance with the present invention.

Referring to FIG. 4, circuits 10, 20 and 30 are combined to form circuit 40 as shown. Once circuit 10 detects the hot swap, the NWELL and node G1 are charged to the pad voltage and there will not be any current flowing through either the pn junction of transistor 32 or the transistor 32 itself (the pmos pull-up transistor) connected to the pad 16.

Figure 5:
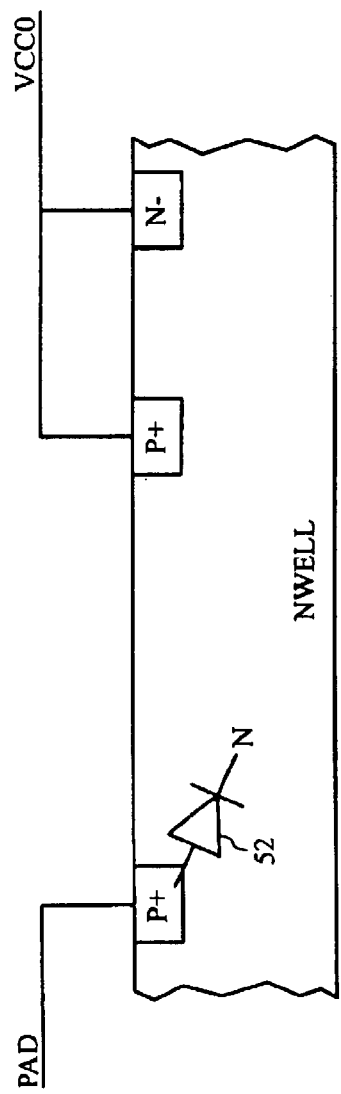
FIG. 5 is a cross-sectional view of a pmos pull-up transistor in accordance with the present invention.

Referring to FIG. 5, The NWELL of the pmos pull-up driver transistor 34(P4 in FIG. 3 and FIG. 4) is usually tied to VCCO. The drain of the transistor 34 is connected to the pad 16. The cross section 50 of this configuration is shown in FIG. 5. When the drain (pad) is higher than the NWELL (VCCO), then the pn junction diode 52 at the pad side of the transistor (the drain) will turn on and a lot of current will flow through the transistor. The second current path is the PMOS pull up transistor 32(P4 in FIG. 3) itself. When the pad voltage is higher than the VCCO and also higher than the voltage at the gate of the transistor 32, the transistor 32 turns on and conducts backward (current flows from pad to VCCO). The present invention takes care of both of these situations by disconnecting the NWELL from the VCCO and by turning the transistor 32 off during hot swap.

In light of the foregoing description of the invention, it should be recognized that the present invention can be realized in hardware, software, or a combination of hardware and software. A method and circuit for hot swap protection according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

What is claimed is:

1. A hot swap protection circuit for an integrated circuit being plugged into a powered-up system, comprises:
   a first circuit for detecting a hot swap condition,
   a second circuit coupled to the first circuit for preventing a pn junction diode in a pull-up transistor from going into a forward bias condition; and
   a third circuit coupled to the first and second circuits for preventing the pull-up transistor from turning on during the hot swap condition.

2. The circuit of claim 1, wherein the circuit for detecting comprises detecting a beginning and an ending of the hot swap condition.

3. The circuit of claim 1, wherein the first circuit comprises a transistor having a gate coupled to an input/output voltage supply during the hot swap and said transistor further having a drain coupled to a pad that is coupled to a signal line of the powered-up system during the hot swap.

4. The circuit of claim 3, wherein the second circuit disconnects the NWELL of the pull-up transistor from the input/output voltage supply during the hot swap condition providing isolation of the NWELL from the input/output voltage supply during the hot swap condition.

5. The circuit of claim 4, wherein the second circuit further charges the NWELL, to the voltage level of the signal line during the hot swap condition to prevent the pn junction diode from going into a forward bias condition.

6. The circuit of claim 1, wherein the pull-up transistor is coupled to a pad of the integrated circuit.

7. The circuit or claim 1, wherein the integrated circuit forms a part of a printed circuit board being plugged into the powered-up system.

8. The circuit of claim 1, wherein the pull-up transistor is a pmos transistor.

9. A method of protecting a powered-up system during the insertion of an integrated circuit, comprising the steps of:
   detecting a hot swap condition;
   preventing a forward bias condition in a pn junction diode of a pull-up transistor of the integrated circuit during the hot swap condition; and
   biasing the pull-up transistor coupled to a pad of the integrated circuit to remain turned off during the hot swap condition.

10. The method of claim 9, wherein the step of detecting comprises the step of detecting the start of the hot swap condition when a voltage at a pad of the integrated circuit is a predetermined amount above an input/output supply voltage and further comprises the step of detecting the end of the hot swap condition when the input/output supply voltage is within a predetermined amount below the voltage at the pad.

11. The method of claim 9, wherein the pull-up transistor forms a portion of a first circuit.

12. A method of protecting a powered-up system during the insertion of a printed circuit board containing an integrated circuit, comprising the steps of:
   detecting a hot swap condition;
   isolating an nwell of a pmos pull-up transistor from a power source of the powered-up system during the hot swap condition; and
   preventing the pmos pull-up transistor coupled to a pad of the integrated circuit from turning on during the hot swap condition.

13. The method of claim 12, wherein the step of detecting comprises the step of detecting a beginning and an ending of the hot swap condition.

14. The method of claim 12, wherein the step of isolating comprises disconnecting the NWELL of the pull-up transistor from the power source of the powered-up system during the hot swap condition providing isolation of the NWELL frost the power source during the hot swap condition.

15. The method of claim 12, wherein the step of isolating comprises the step of charging the NWELL to the voltage level of a signal line of the powered-up system during the hot swap condition to prevent the pn junction diode from going into a forward bias condition.

16. A system, comprising:
   a system backplane; and
   a printed circuit board (PCB) inserted into the system backplane and coupled to receive power therefrom, the PCB comprising an integrated circuit that includes:
      a first circuit that detects a hot swap condition during an insertion of the PCB into the system backplane when the system backplane is powered up;
      a second circuit coupled to the first circuit that prevents a pn junction diode in a pull-up transistor from going into a forward bias condition; and
      a third circuit coupled to the first and second circuits that prevents the pull-up transistor from turning on during the hot swap condition.

17. The system of claim 16, wherein the first circuit detects a beginning and an ending of the hot swap condition.

18. The system of claim 16, wherein the first circuit comprises a transistor having a gate coupled to an input/output voltage supply during the hot swap and further having a drain coupled to a pad that is coupled to a signal line of the system backplane during the hot swap.

19. The system of claim 18, wherein the second circuit disconnects the NWELL of the pull-up transistor from the input/output voltage supply during the hot swap condition, providing isolation of the NWELL from the input/output voltage supply during the hot swap condition.

20. The system of claim 19, wherein the second circuit further charges the NWELL to the voltage level of the signal line during the hot swap condition to prevent the pn junction diode from going into A forward bias condition.

21. The system of claim 16, wherein the pull-up transistor is coupled to a pad of the integrated circuit.

22. The system of claim 16, wherein the pull-up transistor is a PMOS transistor.

23. A printed circuit board (PCB), comprising:
   a plurality of power terminals; and
   an integrated circuit coupled to the power terminals, the integrated circuit comprising:
      a first circuit that detects a hot swap condition when power is applied to the power terminals;
      a second circuit coupled to the first circuit that prevents a pn junction diode in a pull-up transistor from going into a forward bias condition; and
      a third circuit coupled to the first and second circuits that prevents the pull-up transistor from turning on during the hot swap condition.

24. The PCB of claim 23, wherein the first circuit detects a beginning and an ending of the hot swap condition.

25. The PCB of claim 23, wherein the first circuit comprises a transistor having a gate coupled to an input/output voltage supply during the hot swap and further having a drain coupled to a pad that is coupled to a signal line of the PCB during the hot swap.

26. The PCB of claim 25, wherein the second circuit disconnects the NWELL of the pull-up transistor from the input/output voltage supply during the hot swap condition, providing isolation of the NWELL from the input/output voltage supply during the hot swap condition.

27. The PCB of claim 26, wherein the second circuit further charges the NWELL to the voltage level of the signal line during the hot swap condition to prevent the pn junction diode from going into a forward bias condition.

28. The PCB of claim 23, wherein the pull-up transistor is coupled to a pad of the integrated circuit.

29. The PCB of claim 23, wherein the pull-up transistor is a PMOS transistor.

* * * * *